UNITED STATES PATENT OFFICE.

DANDRIDGE H. BIBB, OF NEW YORK, N. Y., ASSIGNOR TO CONTINENTAL PROCESS CORPORATION, OF NEW YORK, N. Y., A CORPORATION OF NEW YORK.

PROCESS OF MAKING COHERING MASSES.

1,158,366.　　　　　Specification of Letters Patent.　　Patented Oct. 26, 1915.

No Drawing.　　　Application filed April 1, 1915.　Serial No. 18,614.

*To all whom it may concern:*

Be it known that I, DANDRIDGE H. BIBB, a citizen of the United States, residing at New York city, county of New York, and State of New York, have invented certain new and useful Improvements in Processes of Making Cohering Masses, of which the following is a full, clear, and exact description.

My invention relates to a new and improved process of making cohering masses and has for its object to produce a durable mass consisting of granular material held together by a water resistant binder produced from what is known as waste sulfite liquor.

It further has for its object to provide a process in which all the necessary ingredients can be conveniently and economically transported prior to mixing.

It is a generally accepted proposition that masses or briquets in order to meet the conditions imposed upon them commercially, should have strength, abrasive resistance, and be substantially resistant to the action of water,—strength for handling during transportation, to resist disintegration while they are dropping through the blast furnace until such time as they reach the melting or burning zone, abrasion resistance so as to resist abrasion during transportation, water resistant so as to withstand moisture while being transported or in storage.

By my process a briquet can be formed which has the strength required, will resist abrasion and is water resistant. Furthermore, the principal ingredients can be easily transported in dry form so as to save in transportation and handling charges.

The following is a description of my invention. In carrying out my process in its preferred form, I evaporate the waste liquor obtained in the sulfite process of paper-making until I obtain a residue consisting of a pitch-like substance which is so hard and dry that it can be pulverized but is still soluble in water. I then pulverize this soluble pitch. After this I form a moist mixture of this soluble pulverized pitch and granular material such as granular magnetite, hematite, titaniferous, copper or other ores, flue dust, pyrites cinders, coal, coke, etc. In doing this I add a suitable solvent such as water. This water may be added to the soluble pitch in the form of steam which is passed through the mass after the mixing or it may be added in liquid form to the pitch alone before the mixing. After the moist mass is obtained I press it into briquets, and then subject it to heat so as to convert the waste sulfite liquor residue into a hard water resistant substance. I have discovered that this change takes place at a critical temperature, viz., at about 600° Fahrenheit, and that a period of about twenty minutes of this heat produces the desired result.

In order to make a briquet of flue dust, I take an amount of subdivided pitch sufficient when reduced to a liquid of about 30° Baumé, to produce a quantity of liquid equal to from 6 to 8 per cent. by weight of the flue dust. With the dry mixing form, I mix this dry pitch with the flue dust and then subject the mixture to a solvent such as water, preferably in the form of steam until the mass becomes slightly moist, the consistency being such that the ingredients will cohere under moderate pressure. I then press the same under strong pressure into the form of briquets. The briquets at this stage are more or less fragile and are not water resistant. I then heat the briquets in a suitable oven for a period of about twenty minutes at a temperature of about 600° Fahrenheit. I thus convert the sulfite residue into a water resistant binder and obtain the desired product.

In using the wet mixing process, I proceed in the same manner except that I add the solvent in liquid form, to the pitch before the mixing.

In briqueting other granular materials, I proceed in a like manner varying the proportions of the binder according to the character of the granular substance and the character of the resultant briquets desired, but subjecting it to substantially the same heat treatment.

By using the soluble pitch as above described, I am able to more easily transport all the necessary ingredients so as to bring them to a common point prior to mixing.

As will be evident to those skilled in the art, my invention permits of various modifications without departing from the spirit thereof or the scope of the appended claims.

What I claim is:

1. The process of producing a cohering mass which consists in evaporating waste sulfite liquor so as to obtain a residue of soluble pitch, pulverizing said pitch, forming a moist mixture comprising said pulverized pitch, granular material and a solvent, forming said mixture into briquets and then converting said residue into a non-coked water resistant substance by the application of heat.

2. The process of producing a co-hering mass which consists in evaporating waste sulfite liquor so as to obtain a residue of soluble pitch, pulverizing said pitch, mixing it with other subdivided material, subjecting it to the action of a solvent so as to moisten the mass, forming the same into briquets and then converting said residue into a non-coked water resistant substance by the application of heat.

3. The process of producing a co-hering mass, which consists in evaporating waste sulfite liquor so as to obtain a residue of soluble pitch, pulverizing said pitch, forming a moist mixture comprising said soluble pulverized pitch, granular material and water, forming said mixture into briquets and then converting said residue into a non-coked water resistant substance by the application of heat.

4. The process of producing a co-hering mass which consists in evaporating waste sulfite liquor so as to obtain a residue of soluble pitch, pulverizing said pitch, mixing it with other subdivided material subjecting it to the action of water so as to moisten the mass, forming the same into briquets and then converting said residue into a non-coked water resistant substance by the application of heat.

5. The process of producing a co-hering mass which consists in evaporating waste sulfite liquor so as to obtain a residue of soluble pitch, pulverizing said pitch, mixing said soluble pulverized pitch with other subdivided material subjecting it to the action of water in vapor form so as to moisten the mass, forming the same into briquets and then converting said residue into a non-coked water resistant substance by the application of heat.

6. The improvement in the process of producing a co-hering mass which consists in mixing a pulverized pitch which is soluble but becomes water resistant when subjected to a critical temperature with other subdivided material and a solvent forming said mixture into briquets and then converting said pitch into a non-coked water resistant substance by the application of heat.

DANDRIDGE H. BIBB.